United States Patent [19]

Nakahara et al.

[11] Patent Number: 5,153,258
[45] Date of Patent: Oct. 6, 1992

[54] SILICONE ANTIFOAMING AGENT COMPOSITION

[75] Inventors: Hideki Nakahara; Koichi Aizawa, both of Kanagawa, Japan

[73] Assignee: Dow Corning K.K., Tokyo, Japan

[21] Appl. No.: 626,922

[22] Filed: Dec. 13, 1990

[30] Foreign Application Priority Data

Dec. 20, 1989 [JP] Japan ................... 1-328153

[51] Int. Cl.$^5$ .............................................. C08L 83/07
[52] U.S. Cl. .................................. 524/588; 252/321; 252/358
[58] Field of Search ................ 252/321, 358; 524/588

[56] References Cited

U.S. PATENT DOCUMENTS

| 2,632,736 | 3/1953 | Currie | 252/358 |
|---|---|---|---|
| 3,020,260 | 2/1962 | Nelson | 260/46.5 |
| 3,455,839 | 7/1969 | Rauner | 252/321 |
| 3,984,200 | 10/1976 | Doesburg | 252/321 |
| 3,984,347 | 10/1976 | Keil | 252/321 |
| 4,396,524 | 8/1983 | Hempel et al. | 252/321 |
| 4,477,626 | 10/1984 | Suzuki | 524/862 |
| 4,486,336 | 12/1984 | Pape et al. | 252/321 |
| 4,639,489 | 1/1987 | Aizawa | 524/588 |
| 4,741,861 | 5/1988 | Okada et al. | 252/321 |
| 4,749,740 | 6/1988 | Aizawa et al. | 252/321 |
| 4,798,679 | 1/1989 | Castro et al. | 252/321 |
| 4,978,471 | 12/1990 | Starch | 252/321 |

Primary Examiner—Melvyn I. Marquis
Assistant Examiner—Karen A. Hellender
Attorney, Agent, or Firm—George A. Grindahl

[57] ABSTRACT

The present invention provides a silicone antifoaming agent composition excellent in the persistence of the foam controlling effect. The silicone antifoaming agent composition comprises a polydiorganosiloxane and silica, which form an antifoaming agent to be improved, and 1 to 200 parts by weight per 100 parts by weight of the sum total of the polydiorganosiloxane plus silica of a lightly crosslinked siloxane having fluidity.

5 Claims, No Drawings

SILICONE ANTIFOAMING AGENT COMPOSITION

BACKGROUND OF THE INVENTION

The present invention relates to a silicone antifoaming agent composition excellent in the persistence of the foam controlling effect.

In various industrial processes involving a treatment step of liquid or a treatment step with liquid. foaming often presents a serious problem. That is, the foaming of liquid is causative of a reduction in the efficiency of the treatment or the quality of a product.

It is well known that an antifoaming agent having an effect of breaking foam. i.e., a foam breaking effect, or an effect of lowering the formability of liquid. i.e., a foam controlling effect is used in order to solve the problematic foaming of liquid. Particularly, a silicone antifoaming agent is favorable, because it is chemically stable, scarcely affects an object of the treatment process, and exhibits a relatively high antifoaming effect even in a minute amount.

Up to this time, there have already been known various silicone antifoaming agents, for example, silicone oils, viscous compounds comprising a silicone oil and a fine inorganic powder such as carbon black, alumina or colloidal silica (i.e., oil compounds). solutions of such a silicone oil or oil compounds in an organic solvent and oil-in-water emulsions prepared by the emulsification of such an oil compound with a surfactant.

However, these silicone antifoaming agents are poor in the persistence of the foam controlling effect. Accordingly, when a prolonged control of foaming is required, they cannot always satisfy the requirement sufficiently.

BRIEF SUMMARY OF THE INVENTION

The present invention has been made under these circumstances and has the object of providing a silicone antifoaming agent composition excellent in the persistence of the foam controlling effect. This object, and others which will become apparent to one of ordinary skill in the antifoaming agent art, are obtained by the silicone antifoaming agent composition of the present invention which comprises (1) a polydiorganosiloxane, (2) silica and (3) 1 to 200 parts by weight per 100 parts by weight of the components (1) and (2) of a crosslinked organopolysiloxane polymer exhibiting fluidity.

DETAILED DESCRIPTION OF THE INVENTION

The silicone antifoaming agent composition of the present invention comprises a polydiorganosiloxane as the component (1), a silica as the component (2) and a crosslinked organopolysiloxane polymer exhibiting fluidity. hereinafter referred to as "fluid crosslinked siloxane", as the component (3).

In the present invention, the polydiorganosiloxane and silica to be used as the components (1) and (2) are those which cooperate to foam a composition substantially having an antifoaming function.

At present, compositions comprising a silica and a polydiorganosiloxane, and substantially having an antifoaming function, are generally known as the antifoaming agent and called "silicone antifoaming agent", "silicone foam breaker", "silicone defoaming agent", "silicone foam controlling agent" or the like.

Accordingly, the polydiorganosiloxane to be used in the present invention as the component (1) may be any one selected from among those used in the above antifoaming agents, while the silica to be used therein as the component (2) may also be any one selected from among those used in the above antifoaming agents.

Alternatively, the above antifoaming agent comprising a polydiorganosiloxane and a silica can be preferably and advantageously used as such as a combination of the components (1) and (2) in the present invention. In this case, the antifoaming agent may further contain component(s) other than the polydiorganosiloxane and silica.

Particular examples of the antifoaming agent which can be used as the components (1) and (2) in the present invention include those comprising a polydiorganosiloxane and a silica as described U.S. Pat. No. 2,632,736; those comprising a polydiorganosiloxane, a silica and a polysiloxane resin as described in U S. Pat. No. 3,455,839; and U.S. Pat. No. 4.639.489: and those comprising a polydiorganosiloxane, a silica, a polysiloxane resin and a polyoxyalkylene-polysiloxane copolymer as described in U.S. Pat. No. 3,984,200 and U.S. application Ser. No. 310,158, filed on Feb. 10, 1989, each incorporated herein by reference to teach polydiorganosiloxanes, silicas and foam control compositions that are useful in the compositions of this invention.

Of course, the polydiorganosiloxane and silica to be used in the present invention as the components (1) and (2) are not each limited to those which have already been known as the constituents of the antifoaming agents. Even when the polydiorganosiloxane and silica which have already been known as the constituents of the antifoaming agent are used, the kinds, combination. and proportions of both components may be selected quite freely so as to attain a substantially desirable antifoaming function.

Accordingly, a composition prepared by blending a polydiorganosiloxane/silica composition which has already been known as the antifoaming agent, with a silica or a polydiorganosiloxane which is either the same as that contained in the polydiorganosiloxane/silica composition or different therefrom can be also used as a combination of the components (1) and (2) according to the present invention.

The crosslinked organopolysiloxane polymer exhibiting fluidity to be combined with the above components (1) and (2) as the component (3) in the present invention is, for example, one prepared by bonding straight-chain organopolysiloxanes with each other and containing crosslinkages in a proper density.

Generally, the crosslinking products of straight chain organopolysiloxane are broadly classified depending upon the crosslink density into three groups, i.e., silicone rubber, silicone gel and fluid crosslinked silicone. A silicone rubber has a sufficiently high crosslink density and exhibits elasticity as a whole. A silicone gel has a crosslink density lower than that of the silicone rubber and is, at ordinary temperatures, in a state of easily causing plastic deformation by an external force or in a state of a viscous fluid exhibiting slight fluidity or a semifluid. Further, a fluid crosslinked silicone has a crosslink density lower than that of the silicone gel and exhibits liquid properties at ordinary temperatures.

Among the crosslinked organopolysiloxane polymers described above, those falling into a category of the silicone gel or fluid crosslinked silicone and exhibiting fluidity have the proper crosslink density and can be used in the present invention. In this specification, the term "crosslinked organopolysiloxane polymer exhibiting fluidity" refers to one which is liquid at ordinary temperatures, or one which deforms more or less by the gravitational force in a free state even if it exhibit solid properties in a state kept in a suitable frame. More specifically the crosslinked organopolysiloxane polymer exhibiting fluidity according to the present invention is one having a penetration of $70 \times 10^{-1}$ mm or above, as determined according to JIS K 2220 which will be described, or one which cannot be subjected to the penetration test because it is liquid.

Representative examples of the process for preparing the crosslinked organopolysiloxane polymer include the following, wherein $R^1$, $R^2$ and $R^3$ in each formula are each an alkyl group such as methyl, ethyl, propy and i-propyl.

Process (1). A process which comprises reacting an organopolysiloxane having vinyl groups at both ends represented by the following formula (a) with an organopolysiloxane having pendant hydrogen atoms represented by the following formula (b) in the presence of a platinum catalyst either at an ambient temperature or under heating:

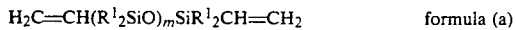

$H_2C=CH(R^1{}_2SiO)_mSiR^1{}_2CH=CH_2$   formula (a)

$-(R^1HSiO)_n(R^1{}_2SiO)_p-$   formula (b)

In the preparation of the crosslinked organopolysiloxane polymer according to the process (1), the organopolysiloxane having vinyl groups at both ends to be used as a raw material is one having a viscosity of 50 to 50,000 cp (50 to 50,000 mPa.s), preferably 100 to 6,000 cp, as determined by the value of m and the identity of $R^1$. On the other hand, the organopolysiloxane having a pendant hydrogen atom is one having a viscosity of 1 to 50,000 cp, preferably 5,000 cp or below, as determined by the values of n and p and the identity of $R^1$, and can have a cyclic, linear or mixed structure. Linear organopolysiloxanes having a pendant hydrogen atom can be terminated with trialkylsiloxy units, such as trimethylsiloxy, or dialkylhydrogensiloxy units, such as dimethylhydrogensiloxy units.

Process (2). A process which comprises reacting an organopolysiloxane having hydroxyl groups at both ends represented by the following general formula (c) with an alkyl silicate represented by the following general formula (d) in the presence of an organotin catalyst under proper humidity conditions:

$HO(R^1{}_2SiO)_qR^1{}_2SiOH$   formula (c)

$(R^1O)_3SiR^2$   formula (d)

Process (3). A process which comprises reacting an organopolysiloxane having hydroxyl groups at both ends represented by the above general formula,(c) with triacetoxysilane represented by the following formula (e) in the presence of an organotin catalyst under proper humidity conditions:

$(CH_3CO_2)_3SiR^1$   formula (e)

Process (4). A process which comprises reacting an organopolysiloxane having hydroxyl groups at both ends represented by the above general formula (c) with an alkyltrioxime represented by the following formula (f) in the presence of an organotin catalyst under proper humidity conditions:

$(R^1R^2NO)_3SiR^3$   formula (f)

Process (5). A process which comprises heating a mixture comprising an organopolysiloxane characterized in that both ends and all pendants are blocked with methyl groups, represented by the following formula (g) and a catalytic amount of benzoyl peroxide to carry out a reaction:

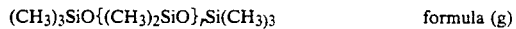

$(CH_3)_3SiO\{(CH_3)_2SiO\}_rSi(CH_3)_3$   formula (g)

Of course, the fluid crosslinked siloxane to be used in the present invention as the component (3) is not limited only to those prepared by the above processes.

Although even a crosslinked organopolysiloxane polymer as described above loses its fluidity when the crosslink density is too high, the crosslinked polymer having a proper fluidity to be preferably used as the component (3) can be prepared by suitably controlling the degree of polymerization of the organopolysiloxane used as a raw material, proportions of raw materials, reaction conditions and so forth to thereby adjust the crosslink density to a proper value.

The fluid crosslinked siloxane to be used as the component (3) in the present invention is particularly preferably one having a penetration of $70 \times 10^{-1}$ mm or above. The term "fluid crosslinked siloxane having a penetration of $70 \times 10^{-1}$ mm or above" used in this specification includes not only those having a penetration of $70 \times 10^{-1}$ mm or above as determined according to JIS K 2220 which will be described below in detail, but also those which are too highly fluid to determine the penetration accurately, though they have apparently a penetration of $70 \times 10^{-1}$ mm or above.

The crosslink density of the fluid crosslinked siloxane which is too highly fluid to determine the penetration accurately can be estimated from its viscosity ratio, i.e. the ratio $\alpha$ of the viscosity $n_1$ of the fluid crosslinked siloxane to the viscosity $n_2$ of the mixture of the reactant components constituting the fluid crosslinked siloxane just after the mixing. That is, a crosslinked siloxane having an indication ($\alpha$) calculated according to the following equation exceeding 3.0, preferably approximately 21, can be preferably used as the component (3). The $n_1$ and $n_2$ are those each determined at 25° C.

$$\alpha = n_1/n_2$$

Particular examples of the fluid crosslinked siloxane to be used in the present invention include those described in U.S. Pat. Nos. 3,020,260 and 4,477,626, incorporated herein by reference.

According to the present invention, the amount of the fluid crosslinked siloxane as the component (3) is 1 to 200 parts by weight, preferably 10 to 200 parts by weight, per 100 parts by weight of the sum total of the components (1) and (2). If the amount of the component (3) is too small the desired effect of the fluid crosslinked siloxane will not be exhibited sufficiently, so that the persistence of the foam controlling effect will not be sufficiently improved.

The silicone antifoaming agent composition of the present invention can be prepared by, for example, a process which comprises adding a fluid crosslinked siloxane either as such or in a state diluted with a proper solvent to a composition comprising a polydiorganosiloxane and a silica to dissolve or disperse the former in the latter homogeneously, or a process comprising adding a fluid crosslinked siloxane in any step during the preparation of an antifoaming agent from a polydiorganosiloxane and a silica, though the process for the preparation thereof is not limited to these processes.

Of course, the silicone antifoaming agent composition of the present invention may, if necessary, contain other additives.

EFFECTS OF THE INVENTION

Since the silicone antifoaming agent composition of the present invention contains a fluid crosslinked siloxane as the component (3) in addition to a combination of a polydiorganosiloxane as the component (1) with a silica as the component (2) which substantially exhibits an antifoaming function, the persistence of the foam controlling effect is improved enough to exert a prolonged effect on the system to be treated.

The reason why such an advantageous improvement can be attained is estimated to be that the dispersion of the molecules and particles of the antifoaming agent composition into the liquid phase to be treated with the lapse of time is inhibited by virtue of the structural specificity of the fluid crosslinked siloxane, so that the molecules and particles remain on the surface of the liquid phase to thereby attain a prolonged antifoaming function.

Examples of the present invention will now be given though the present invention is not limited to them. Hereinafter, all parts and percentages are by weight.

The silicone compositions and fluid crosslinked siloxanes used in the Examples and Comparative Examples will first be given, The term "silicone composition" as used herein refers to a composition comprising a polydiorganosiloxane and a silica.

The penetration of a fluid crosslinked siloxane was determined by the use of a penetrometer according to JIS K 2220, a cone of ¼ scale according to ASTM D 1403-69 and a sample cell having an inner diameter of 50 mm and a height of 30 mm under the conditions of a simple thickness of 20 mm, a load (the total weight of the cone and the shaft to be connected to the cone) of $9.38 \pm 0.10$ g, a loading time of 30 seconds and a measurement temperature of $25 \pm 2°$ C., while the viscosity was determined at 25° C.

Silicone Composition 1:

A silicone composition prepared according to the process described in Example 1 of Japanese Patent Laid-Open No. 251906/1985 (Example 1 of U.S. Pat. No. 4,639,489) by mixing 60 parts by weight of a trimethylsilyl-blocked polydimethylsiloxane (viscosity: 1,000 centistokes); 29 parts by weight of an hydroxyl-blocked polydimethylsiloxane (viscosity: 12,500 centistokes): and 2.9 parts by weight of ethyl polysilicate: and the mixture was heated to 130 to 140 degrees C. after which there was added 0.48 parts by weight of a catalyst prepared by heating a mixture of a trimethylsilyl-blocked polydimethylsiloxane having a viscosity of 1,000 centistokes with potassium hydroxide at a weight ratio of 9:1 at 120 degrees C. for 15 minutes: 2.9 parts by weight of silica (surface area: 200 m²/g) and 4.8 parts by weight of an hydroxyl-blocked polydimethylsiloxane (viscosity: 40 centistokes): and heating was continued at 180 degrees C. for 4 hours and then for 1 hour at 40 mm of Hg to remove volatile material.

Silicone Composition 2:

A silicone composition prepared according to the process described in Example 3 of Japanese Patent Publication No. 2263/1952 (equivalent to U.S. Pat. No. 2,632,736).

Fluid Crosslinked Siloxane 1:

A liquid crosslinked silicone prepared by heating a mixture comprising 98.8% of an organopolysiloxane represented by the following formula (A), 0.8% of an organopolysiloxane represented by the following formula (B), 0.2% of a platinum catalyst and 0.2% of a crosslinking retarder at 150° C. for 45 minutes to carry out crosslinking:

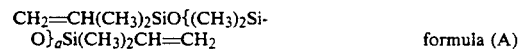

CH$_2$=CH(CH$_3$)$_2$SiO{(CH$_3$)$_2$SiO}$_a$Si(CH$_3$)$_2$CH=CH$_2$   formula (A)

(a is about 160)

(CH$_3$)$_3$SiO{(CH$_3$)(H)SiO}$_b${(CH$_3$)$_2$SiO}$_c$Si(CH$_3$)$_3$   formula (B)

(b is about 5 and c is about 3)

Fluid Crosslinked Siloxanes 2A to 2E

Fluid crosslinked siloxane polymers, differing in fluidity as shown in Table 1, which were prepared by heating the same mixture as that used in the preparation of crosslinked siloxane 1.

Fluid Crosslinked Siloxane 3:

A fluid crosslinked siloxane having a penetration of $120 \times 10^{-1}$ mm, prepared by heating a mixture comprising 92.6% of an organopolysiloxane having vinyl groups at both end represented by the following formula (C), 7.0% of an organopolysiloxane represented by the following formula (D), 0.15% of an organopolysiloxane represented by the following formula (E), 0.05% of a platinum catalyst and 0.2% of a crosslinking retarder at 150° C. for 45 minutes to carry out crosslinking:

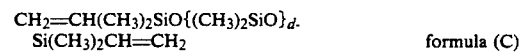

CH$_2$=CH(CH$_3$)$_2$SiO{(CH$_3$)$_2$SiO}$_d$Si(CH$_3$)$_2$CH=CH$_2$   formula (C)

(d is about 160)

H(CH$_3$)$_2$SiO{(CH$_3$)$_2$SiO}$_e$Si(CH$_3$)$_2$H   formula (D)

(e is about 15)

(CH$_3$)$_3$SiO{(CH$_3$)(H)SiO}$_f${(CH$_3$)$_2$SiO}$_g$Si(CH$_3$)$_3$   formula (E)

(f is about 5 and g is about 3)

EXAMPLES 1 to 14

One of the above Si compositions 1 and 2 and one of the above crosslinked siloxanes 1 2A to 2E and 3 were combined according to the formulations specified in Table 1 and mixed together with a mixer for about 20 minutes. Thus, antifoaming agent compositions S-1 to S-14 according to the present invention were obtained.

EXAMPLE 15

After the addition of the silica to the polyorganosiloxane in the preparation of Si composition 1, the above crosslinked siloxane 1 was added in such an amount that the content of the crosslinked siloxane 1 in the final antifoaming agent composition was 30%. The obtained mixture was homogenized with a homomixer, heated for 4 hours and cooled to a room temperature to give a viscous, colorless and transparent silicone antifoaming agent composition S-15. The whole steps were conducted under purging with nitrogen gas.

COMPARATIVE EXAMPLES 1 and 2

The above Si compositions 1 and 2 were used as such as comparative silicone antifoaming agent compositions C-1 and C-2, respectively, without using any fluid crosslinked siloxane.

COMPARATIVE EXAMPLE 3

The same procedure as that of Example 1 was repeated except that the crosslinked siloxane 1 was replaced by an uncrosslinked organopolysiloxane mixture only comprising an organopolysiloxane represented by the formula (A) and an organopolysiloxane represented by the formula (B). Thus, a comparative antifoaming agent composition C-3 was obtained.

Test on antifoaming characteristics.

The antifoaming agent compositions thus prepared were each emulsified according to the following formulation to give a 10% emulsion:

| | |
|---|---|
| antifoaming agent composition | 10.0% |
| polyoxyethylene monostearate | 1.4% |
| glycerol fatty acid ester | 1.2% |
| hydroxyethylcellulose | 0.5% |
| preservative | 0.1% |
| water | the balance |

The obtained emulsions were each shaken in a barrel wrist action shaker under the following condition I or II (different from I only in the amount of an antifoaming agent) for 10 seconds to determine the time t (sec) which has elapsed from the termination of the shaking until the disappearance of big foams and the time T (sec) which has elapsed therefrom until the appearance of a liquid surface. Thereafter, the emulsions were further shaken for additional 40 seconds to conduct similar tests. Furthermore, the shaking of the emulsions and the determination of the times were repeated with shaking times of 60, 120, 180 and 180 seconds.

The antifoaming agent compositions of Examples 1 to 12 and 15 and Comparative Examples 1 and 2 were examined under the condition I, while those of Examples 13 and 14 were examined under the condition II, The results are given in Table 2.

The composition of Comparative Example 1 was also examined under the condition II and the results are given in Table 2 as "Comparative Example 1a"

Condition I
  test vessel: 200-ml glass bottle
  liquid to be foamed: 100 ml of a 1% aqueous solution of Tween 80 (a product of Kao-Atlas Co., Ltd.)
  amount of antifoaming agent: 20 ppm (in terms of silicone)
  frequency of vibration: 350 cycles/min
  test temperature: 25° C.

Condition II
  test vessel: 200-ml glass bottle
  liquid to be foamed: 100 ml of a 1% aqueous solution of Tween 80 (a product of Kao-Atlas Co., Ltd.)
  amount of antifoaming agent: 10 ppm (in terms of silicone)
  frequency of vibration: 350 cycles/min test temperature: 25° C.

It can be understood from the results given in Table 2 that the T values of the compositions of Examples 1 to 11 and 15 after the second run of 180-second shaking are all shorter than that of the composition of Comparative Example 1. This reveals that the silicone antifoaming agent composition of the present invention has an antifoaming effect for a time longer than that of the antifoaming agent of the prior art.

Similar relations are found between Comparative Example 2 and Example 12 and between Comparative Example 1a and Example 13 or 14.

As described above, the antifoaming agent composition of the present invention can exhibit an excellent prolonged foam controlling effect, i.e., is excellent in the persistence of the foam controlling effect.

TABLE 1

| | Antifoaming agent composn. | Viscosity of composn. (cp) | Silicone composn. | | Fluid crosslinked siloxane | | | |
|---|---|---|---|---|---|---|---|---|
| | | | kind | amt. (pt) | kind | form | penetration [10⁻¹ mm] | amt. (pt) |
| Ex. 1 | S-1 | 37,000 | Si composn. 1 | 90 | crosslinked siloxane 1 | liquid | 21.0* | 10 |
| Ex. 2 | S-2 | 28,000 | Si composn. 1 | 80 | crosslinked siloxane 1 | liquid | 21.0* | 20 |
| Ex. 3 | S-3 | 21,700 | Si composn. 1 | 70 | crosslinked siloxane 1 | liquid | 21.0* | 30 |
| Ex. 4 | S-4 | 19,600 | Si composn. 1 | 60 | crosslinked siloxane 1 | liquid | 21.0* | 40 |
| Ex. 5 | S-5 | 17,000 | Si composn. 1 | 50 | crosslinked siloxane 1 | liquid | 21.0* | 50 |
| Ex. 6 | S-6 | 15,000 | Si composn. 1 | 40 | crosslinked siloxane 1 | liquid | 21.0* | 60 |
| Ex. 7 | S-7 | 14,900 | Si composn. 1 | 70 | crosslinked siloxane 2A | liquid | 4.0* | 30 |
| Ex. 8 | S-8 | 17,000 | Si composn. 1 | 70 | crosslinked siloxane 2B | liquid | 6.3* | 30 |
| Ex. 9 | S-9 | 18,900 | Si composn. 1 | 70 | crosslinked siloxane 2C | liquid | 10.0* | 30 |
| Ex. 10 | S-10 | 21,700 | Si composn. 1 | 70 | crosslinked siloxane 2D | liquid | 21.0* | 30 |
| Ex. 11 | S-11 | 23,000 | Si composn. 1 | 70 | crosslinked siloxane 2E | gel | 110 | 30 |
| Ex. 12 | S-12 | 3,000 | Si composn. 2 | 70 | crosslinked siloxane 1 | liquid | 21.0* | 30 |
| Ex. 13 | S-13 | 23,000 | Si composn. 1 | 70 | crosslinked siloxane 2E | gel | 110 | 30 |
| Ex. 14 | S-14 | 25,000 | Si composn. 1 | 70 | crosslinked siloxane 3 | gel | 120 | 30 |
| Ex. 15 | S-15 | 19,000 | | | addition of 30% of crosslinked siloxane 1 during the preparation of Si composition 1 | | | |
| Comp. Ex. 1 | C-1 | 48,000 | Si composn. 1 | 100 | — | — | — | — |
| Comp. Ex. 2 | C-2 | 1,500 | Si composn. 2 | 100 | — | — | — | — |
| Comp. Ex. 3 | C-3 | 9,400 | Si composn. 1 | 70 | uncrosslinked siloxane | liquid | — | 30 |

("*": a value; the penetration is immeasurable owing to remarkably high fluidity).

TABLE 2

| | Antifoaming agent composition | Condition | Shaking time (sec) | | | | | |
|---|---|---|---|---|---|---|---|---|
| | | | 10 t/T | 40 t/T | 60 t/T | 120 t/T | 180 t/T | 180 t/T |
| Ex. 1 | S-1 | I | / | / | / | / | / | 6.9/38.0 |
| Ex. 2 | S-2 | I | / | / | / | / | / | 6.8/32.0 |
| Ex. 3 | S-3 | I | / | / | / | / | / | 6.6/26.0 |
| Ex. 4 | S-4 | I | / | / | / | / | / | 6.0/21.0 |
| Ex. 5 | S-5 | I | / | / | / | / | / | 6.5/20.0 |
| Ex. 6 | S-6 | I | / | / | / | / | / | 6.3/18.0 |
| Ex. 7 | S-7 | I | 3.0/2.5 | 3.2/2.7 | 3.5/3.0 | 4.0/4.5 | 5.5/25.0 | 8.0/30.0 |
| Ex. 8 | S-8 | I | 3.0/2.5 | 3.0/2.5 | 3.5/3.0 | 4.0/4.5 | 5.5/26.0 | 7.5/40.0 |
| Ex. 9 | S-9 | I | 3.0/2.5 | 3.2/2.7 | 3.5/3.0 | 4.0/4.5 | 5.0/15.0 | 7.0/39.0 |
| Ex. 10 | S-10 | I | 3.0/2.5 | 3.0/2.5 | 3.5/3.0 | 4.0/4.5 | 5.0/10.0 | 6.6/26.0 |
| Ex. 11 | S-11 | I | 4.0/3.5 | 4.5/4.0 | 6.0/6.5 | 8.0/14.0 | 11.5/18.5 | 15.5/25.0 |
| Ex. 12 | S-12 | I | 4.0/5.0 | 5.0/18.0 | 15.0/45.0 | 27.0/105 | 38.0/120* | 62.0/120* |
| Ex. 13 | S-13 | II | 3.0/2.5 | 3.5/3.0 | 4.5/5.0 | 7.5/35 | 9.5/116 | 12.0/96.0 |
| Ex. 14 | S-14 | II | 3.0/2.5 | 4.0/3.5 | 5.0/5.5 | 8.0/29.0 | 11.0/64.0 | 14.0/85.5 |
| Ex. 15 | S-15 | I | 3.5/3.0 | 3.5/3.0 | 4.0/3.5 | 4.0/5.0 | 5.0/8.0 | 6.0/23.0 |
| Comp. Ex. 1 | C-1 | I | 2.0/1.5 | 2.5/2.0 | 3.0/3.0 | 3.5/5.0 | 5.5/27.0 | 7.0/47.0 |
| Comp. Ex. 2 | C-2 | I | 3.0/4.0 | 4.0/13.0 | 15.0/120* | 36.0/120* | 65.0/120* | 105.0/120* |
| Comp. Ex. 1a | C-1 | II | 2.5/2.0 | 3.0/2.5 | 3.5/4.5 | 5.0/47 | 9.0/117 | 12.5/120* |
| Comp. Ex. 3 | C-3 | I | 3.0/2.5 | 3.0/2.5 | 3.5/3.0 | 5.0/19.0 | 8.0/51.0 | 9.0/72.0 |

("120*" means 120 seconds or longer)

That which is claimed is:

1. A silicone antifoaming agent composition comprising (1) a polydiorganosiloxane, (2) silica and (3) 1 to 200 parts by weight per 100 parts by weight of the sum total of the components (1) and (2) of a crosslinked organopolysiloxane polymer exhibiting fluidity and having a penetration of at least $70 \times 10^{3}$ $\frac{1}{1}$ millimeters and a viscosity ratio ($\alpha$) of at least 3.0; said crosslinked organopolysiloxane having been prepared by a process which comprises reacting an organopolysiloxane having the formula $H_2C=CH(R^1_2SiO)_m R^1_2SiCH=CH_2$ and a viscosity of 50 to 50,000 mPa.s at 25° C., as determined by the value of m and the identity of $R^1$, with an organohydrogenpolysiloxane having pendant hydrogen atoms represented by the formula $-(R^1HSiO)_n(R^1_2SiO)_p-$ and having a viscosity of 1 to 50,000 mPa.s at 25° C., as determined by the values of n and p and the identity of $R^1$, wherein $R^1$ in each formula is an alkyl group, in the presence of a platinum catalyst.

2. A silicone antifoaming agent composition as set forth in claim 1, wherein said crosslinked organopolysiloxane polymer exhibiting fluidity has a viscosity ratio of approximately 21.

3. A silicone antifoaming agent composition as set forth in claim 2, wherein said crosslinked organopolysiloxane polymer exhibiting fluidity has been prepared by a process which comprises reacting 98.8 parts by weight of an organopolysiloxane represented by the formula $CH_2=CH(CH_3)_2SiO\{(CH_3)_2SiO\}_{16}OSi(CH_3)_2CH=CH_2$, 0.8 parts by weight of an organohydrogenpolysiloxane represented by the formula $(CH_3)_3SiO\{(CH_3)(H)SiO\}_5\{(CH_3)_2SiO\}_3Si(CH_3)_3$ 0.2 parts by weight of a platinum catalyst and 0.2 parts by weight of a crosslinking retarder at 150° C. for 45 minutes.

4. A silicone antifoaming agent composition as set forth in claim 3, wherein said crosslinked organopolysiloxane polymer exhibiting fluidity is present in an amount of from 10 to 200 parts by weights per 100 parts by weight of the sum total of the components (1) and (2).

5. A silicone antifoaming agent composition as set forth in claim 4, wherein the total of components (1) and (2) consists essentially of a composition obtained by (1) heating to 130° to 140° C. a mixture of 60 parts by weight of a trimethylsilyl-blocked polydimethylsiloxane having a viscosity of 12,500 centistokes at 25° C.; and 2.9 parts by weight of an hydroxyl-blocked polydimethylsiloxane having a viscosity of 12,500 centistokes at 25° C.; and 2.9 parts by weight of ethyl polysilicate;

(2) adding to the composition of (1) 0.48 parts by weight of a catalyst prepared by heating a mixture of a trimethylsilyl-blocked polydimethylsiloxane having a viscosity of 1,000 centistokes at 25° C. with potassium hydroxide at a weight ratio of 9:1 at 120° C. for 15 minutes; 2.9 parts by weight of silica having a surface area of 200 m$^2$/g; and 4.8 parts by weight of an hydroxyl-blocked polydimethylsiloxane having a viscosity of 40 centistokes at 25° C.; and (3) heating the composition of (2) at 180° C. for 4 hours and then for 1 hour at 40 mm of Hg to remove volatile material.

* * * * *

UNITED STATES PATENT AND TRADEMARK OFFICE
CERTIFICATE OF CORRECTION

PATENT NO. : 5,153,258
DATED : 10/6/92
INVENTOR(S) : Hideki Nakahara; Koichi Aizawa It is certified that error appears in the above-identified patent and that said Letters Patent are hereby corrected as shown below:

Claim No. 5., Column 10, Lines 32-54

5. A silicone antifoaming agent composition as set forth in claim 4, wherein the total of components (1) and (2) consists essentially of a composition obtained by
(1) heating to 130° to 140° C. a mixture of 60 parts by weight of a trimethylsilyl-blocked polydimethylsiloxane having a viscosity of 1,000 centistokes at 25° C.; and 29 parts by weight of an hydroxyl-blocked polydimethylsiloxane having a viscosity of 12,500 centistokes at 25° C.,; and 2.9 parts by weight of ethyl polysilicate;
(2) adding to the composition of (1) 0.48 parts by weight of a catalyst prepared by heating a mixture of a trimethylsilyl-blocked polydimethylsiloxane having a viscosity of 1,000 centistokes at 25° C. with potassium hydroxide at a weight ratio of 9:1 at 120° C. for 15 minutes; 2.9 parts by weight of silica having a surface area of 200 m 2/g; and 4.8 parts by weight of an hydroxyl-blocked polydimethylsiloxane having a viscosity of 40 centistokes at 25° C.; and
(3) heating the composition of (2) at 180° C. for 4 hours and then for 1 hour at 40 mm of Hg to remove volatile material.

Signed and Sealed this

Seventeenth Day of April, 2001

Attest:

NICHOLAS P. GODICI

Attesting Officer    Acting Director of the United States Patent and Trademark Office